(No Model.) 2 Sheets—Sheet 2.
W. WRIGHT.
VALVE FOR STEAM ENGINES.
No. 428,541. Patented May 20, 1890.
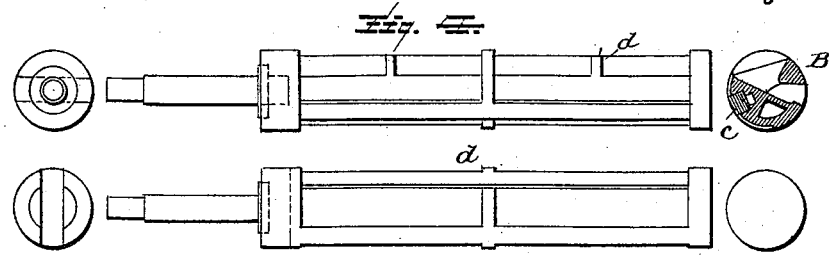
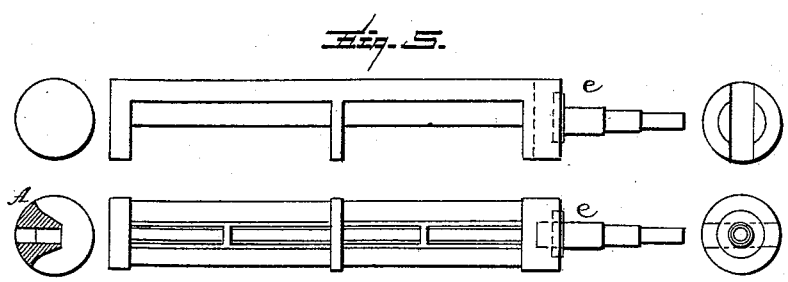
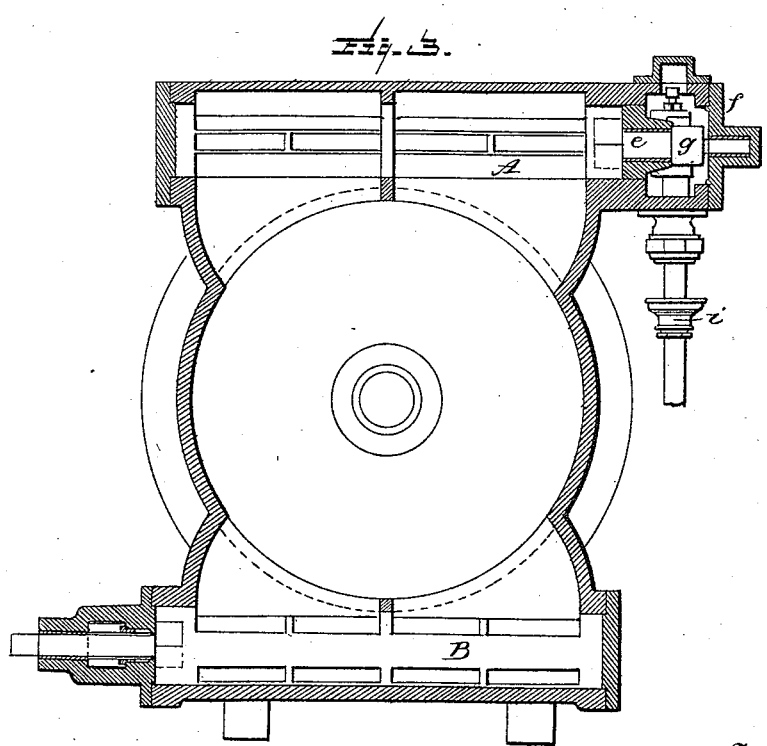
Witnesses
L. C. Mills.
E. H. Bond.
Inventor
William Wright.
By E. B. Stocking
Attorney.

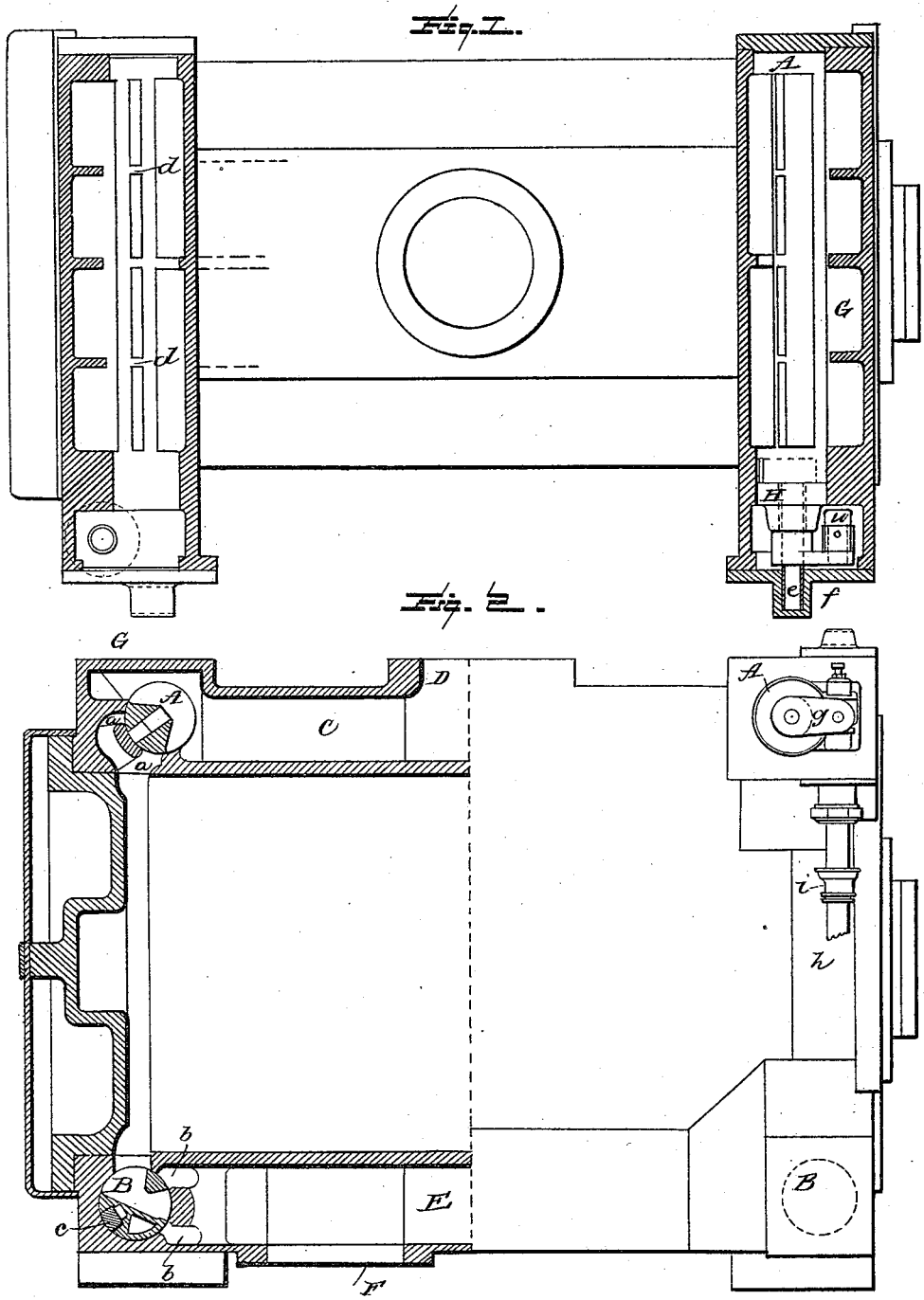

UNITED STATES PATENT OFFICE.

WILLIAM WRIGHT, OF NEWBURG, NEW YORK.

VALVE FOR STEAM-ENGINES.

SPECIFICATION forming part of Letters Patent No. 428,541, dated May 20, 1890.

Application filed August 13, 1889. Serial No. 320,623. (No model.)

*To all whom it may concern:*

Be it known that I, WILLIAM WRIGHT, a citizen of the United States, residing at Newburg, in the county of Orange, State of New York, have invented certain new and useful Improvements in Valves for Steam-Engines, of which the following is a specification, reference being had therein to the accompanying drawings.

This invention relates to certain new and useful improvements in rotative valves connected with automatic liberating-valve gear.

The object of said improvements is to enable steam-engines with circular seats and rotative valves to run at a higher speed than heretofore. The ordinary rotative-valve engine, having only one opening in the seat and no opening through the valve, admitting steam over the edge of the valve into the cylinder-port, requires a wide opening to admit and release the necessary amount of steam, the valve traveling over a space equal to the width of the port and the lap of valve, the time of closing being governed by the width of opening at the moment of the release and lap of the valve. The distance traveled and time of closing of valves in one-ported seats in large engines of this class limit the number of revolutions that such engines can be run practically.

The improvements consist, first, in constructing rotative valves for two or more ported valve-seats with the least amount of frictional surface subject to steam-pressure. In constructing a valve for a two-ported valveseat the valve has one opening through the valve to admit steam into one port, the other port receiving steam over the outer edge of the valve when the opening in the seat is uncovered. Seats having two or more ports may have valves constructed with one less opening through the valves than the number of ports in the seat, reducing the amount of valve-surface to a minimum, thus lessening the friction and power to move the valve. Engines thus made can be run at a higher speed, as the length of valve, travel, and time of closing are proportionally shortened.

The improvements consist, second, in a continuation of the steam-valve case on one end, forming a steam-chamber for connecting the steam-valve stem with the lever and attached rod for working the valve, the rod passing out of the chest through the stuffing-box and connected with automatic liberating-valve gear. Steam being admitted in the chamber, a pressure is exerted to close the valve quickly when released by the automatic liberating-gear, the said pressure being equal to the area of the rod in square inches multiplied by the pressure of steam.

The invention consists in the peculiarities of construction and the novel combinations, arrangement, and adaptation of parts, all as more fully hereinafter described, shown in the drawings, and then particularly pointed out in the appended claims.

Like letters of reference indicate like parts in all the figures of the drawings.

Referring to the drawings, Figure 1 is a side view of the steam-cylinder for large-size engines, one half in section and the other half in outside view. Fig. 2 is a top view showing steam-cases in section. Fig. 3 is a cross-section of the cylinder through the valve-chests. Fig. 4 are detail views of steam-valves. Fig. 5 are detail views of exhaust-valves.

A A are steam-valves for the admission of steam into the cylinder for a two-ported seat. The steam passes through the valve for one of the ports and outside of the valve for the other port.

*a a* are the steam ports or openings in the seat to admit the steam into the cylinder.

B B are the exhaust-valves for a two-ported seat.

*b b* are the exhaust-ports, the valves having one opening through the valve corresponding with one of the ports, the other port communcating direct with the exhaust-steam from the cylinder by the uncovering of the opening by the movement of the valve.

C is a longitudinal block fitted in the valve, with a recess behind the block for receiving springs for the purpose of keeping the working-face of the valve steam-tight.

C is the steam-chest.

D is the steam-opening for the admission of steam.

E is the exhaust-chest.

F is the outlet-opening for exhaust-steam.

G G are the steam chests or cases, with two or more longitudinal openings in ports for the admission of steam into the cylinder, said ports having bridge-pieces $d\ d\ d$ cast in for strengthening.

H H are bearings bored, turned, and fitted in the end of the case next to the end of the valves for valve-stems. The stems $e\ e$ have a T-head, which fits in slots in the end of the valves. The positions of said slots are such as to allow the valves to remain steam-tight as the surfaces wear away, the valve being free to move in the slot. The other ends of the steam-valve stems have a bearing in bonnets $f f$.

A lever $g\ g$ is keyed on the steam-valve stem. The end of the lever has a pin which is fitted in the brass box. Said box is fitted in the yoke on the rod $h\ h$. The box slides in the yoke, adapting itself to the vibration of the lever. A gib and set-screw are fitted to the yoke to take up the wear of the box.

The rod $h\ h$ is operated by the automatic valve-gear.

$i\ i$ is a drip-cup for receiving the drip from the gland around the rod $h$.

The exhaust-valves are connected with T-headed stems similar to steam-valves, the stem passing through glands and supported by outer bearings. A lever on the outer end of the stem is connected to the rod and pin on the wrist-plate, by which it is operated.

The construction of small cylinders will be similar to large cylinders, with the exception that the steam and exhaust valves and cases are placed on the lower side of the cylinder; also, the continuation of the steam-case on the larger cylinders is omitted on the small cylinders, as the steam-valves on the small cylinders are closed by the action of a weight or vacuum-chamber. The construction of the valves is the same as in the larger cylinders having two or more ports in seats. The valves are connected to T-headed stems passing through glands to an outer bearing and connected with levers and rods to wrist-plates and automatic liberating-valve gear.

What I claim as new is—

1. The combination, with a two-ported valve-seat, of a rotating valve having a single parallel-walled diametric opening therethrough, with the body of the valve removed to permit a passage of steam around the same.

2. The combination, with a two-ported valve-seat, of a rotating valve having a single diametric opening therethrough from the center outward for registering with one port and the body of the valve removed opposite and at both sides of extensions of the opening, as set forth.

3. The rotative valve for cylindrical seats with two or more ports having circular heads and diametrical openings extending along its axis, with the body of the valve removed between said heads, substantially as described.

In testimony whereof I affix my signature in presence of two witnesses.

WILLIAM WRIGHT.

Witnesses:
 CHARLES D. ROBINSON,
 HENRY W. CHADEAYNE.